United States Patent
Egawa et al.

(10) Patent No.: US 6,693,771 B2
(45) Date of Patent: Feb. 17, 2004

(54) MAGNETIC HEAD WITH SLIDER INCLUDING RESPECTIVE CORES FOR HIGH AND STANDARD RECORDING DENSITIES, AND METHOD FOR PRODUCING THE SAME

(75) Inventors: Motoji Egawa, Iwata-gun (JP); Shigeyuki Ooishi, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 95 days.

(21) Appl. No.: 09/956,028

(22) Filed: Sep. 20, 2001

(65) Prior Publication Data

US 2002/0039255 A1 Apr. 4, 2002

(30) Foreign Application Priority Data

Oct. 3, 2000 (JP) .................................. 2000-303574

(51) Int. Cl.[7] .............................. G11B 5/105; G11B 5/60
(52) U.S. Cl. ................................. 360/234.9; 360/235.4
(58) Field of Search .................... 360/234.9, 235.4, 360/234.3, 234.7, 236.6, 237.1

(56) References Cited

U.S. PATENT DOCUMENTS 5,889,642 A * 3/1999 Egawa et al. ............... 360/125
6,166,887 A * 12/2000 Hasegawa et al. ......... 360/246.4
6,175,473 B1 * 1/2001 Noguchi .................... 360/234.9
6,404,591 B1 * 6/2002 Sanpei et al. ............. 360/234.9
6,542,333 B1 * 4/2003 Sano et al. ............... 360/234.9

FOREIGN PATENT DOCUMENTS

| JP | 10-49812 A | * | 2/1998 |
| JP | 11-353607 A | * | 12/1999 |
| JP | 2000-260006 A | * | 9/2000 |
| JP | 2000-268310 A | * | 9/2000 |
| JP | 2002-117517 | * | 4/2002 |

* cited by examiner

Primary Examiner—Jefferson Evans
(74) Attorney, Agent, or Firm—Oliff & Berridge, PLC

(57) ABSTRACT

A magnetic head exhibits a good traceability without damaging itself or a magnetic disk. The magnetic head includes a slider, and the slider includes a plurality of magnetic cores and an outrigger having a plurality of substantially rectangular slots. The magnetic cores have respective operating gaps for a standard recording density and a high recording density and are inserted into the respective substantially rectangular slots. One magnetic core for a high recording density having a spacer superposed thereon is inserted in one of the slots in such a manner as to touch a wall of the slot. The slider includes a rail surface which has a groove passing longitudinally through the spacer substantially at the center of its thickness and reaching both lengthwise ends of the slider, and the rail surface slides against a magnetic recording medium.

5 Claims, 6 Drawing Sheets

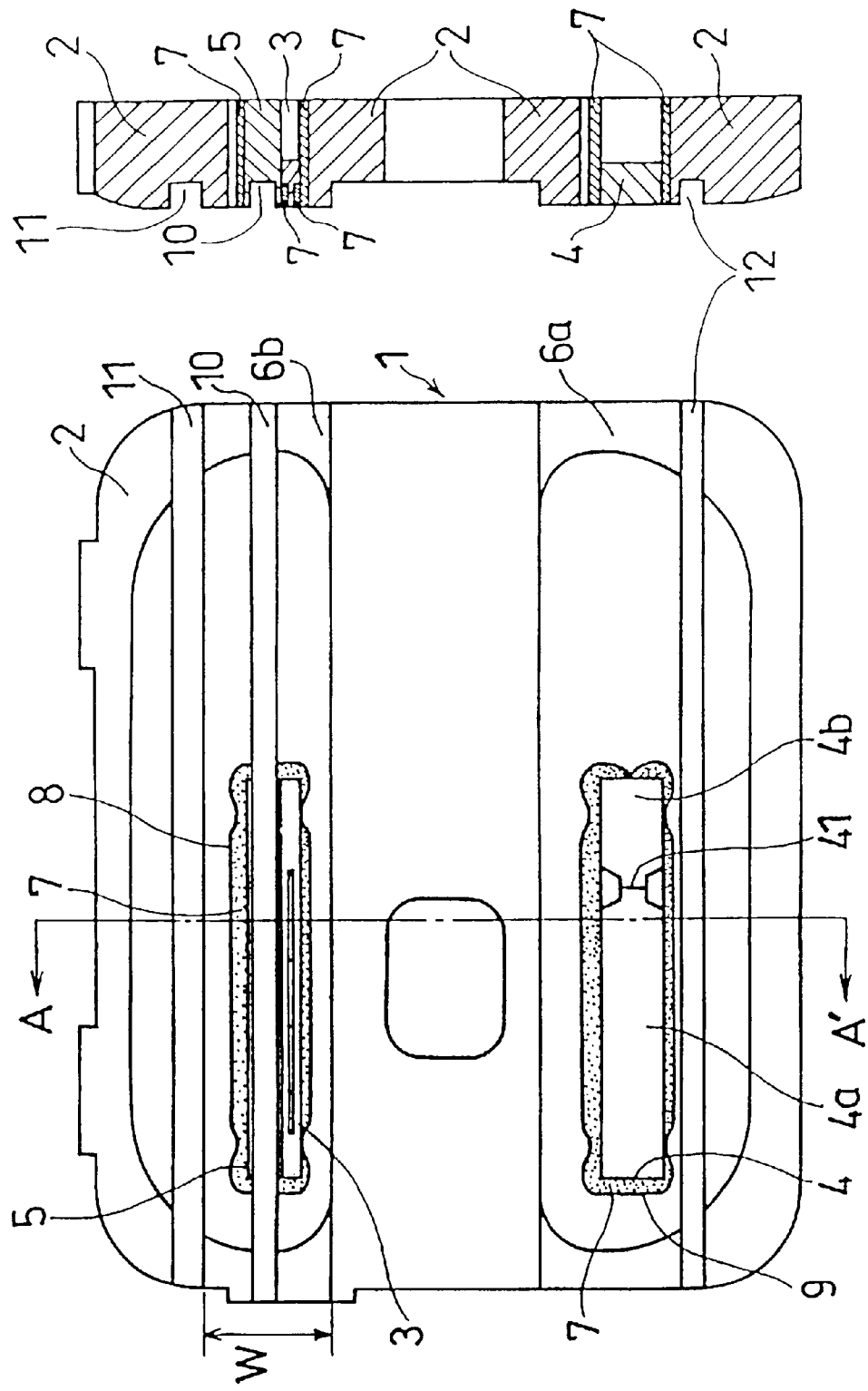

MAGNETIC HEAD WITH SLIDER INCLUDING RESPECTIVE CORES FOR HIGH AND STANDARD RECORDING DENSITIES, AND METHOD FOR PRODUCING THE SAME

BACKGROUND OF THE INVENTION

1. Field of the Invention

The present invention relates to a magnetic head of sliding type used in a high recording density floppy disk drive having downward compatibility, and a method for producing the same.

2. Description of the Related Art

With a trend towards a higher recording density of a floppy disk drive increasing from 120 MB to 260 MB, the rotational speed of a spindle has accordingly increased from 740 rpm to 1500 rpm, and the recording frequency has also increased to approximately 7 MHz. In the trend, the traceability of magnetic cores, especially for a high recording density, along recording media is increasingly becoming important for achieving stable electromagnetic conversion characteristics. The traceability, i.e., facility to identify and follow a track in a repeatable manner, depends upon the contact between an operating gap of a magnetic core and a signal recording surface of a recording medium.

As the inventors have disclosed in Japanese Patent Application No. 2000-105863, a slider of a conventional magnetic head having downward compatibility has a construction as shown in FIGS. 6A and 6B, wherein FIG. 6A is a front view and FIG. 6B is a sectional view taken along the line A–A'. Such a slider 1 includes a magnetic core 4 having an operating gap for a standard recording density, a magnetic core 3 having an operating gap for a high recording density, and an outrigger 2 having substantially rectangular slots 8 and 9 for inserting the respective magnetic cores into. The magnetic core 3 for a high recording density having a spacer 5 superposed thereon is inserted into the slot 8 in such a manner that a side of the magnetic core 3 touches a wall of the slot 8.

Furthermore, the magnetic core 4 having an operating gap for a standard recording density is inserted into the slot 9. The two slots 8 and 9 are filled with a sealing glass 7 thereby sealing up the magnetic cores 3 and 4, and the spacer 5.

The thickness of the magnetic core 4 having an operating gap for a standard recording density presents no problem in maintaining the accuracy of a die for making the slot 9. However, it is difficult to maintain the accuracy of a die for making the slot 8 to precisely fit the magnetic core 3 because the thickness of the magnetic core 3 is approximately 80 μm. For this reason, the slot 8 is formed to have a width larger than the thickness of the magnetic core 3, and the high recording density magnetic core 3 and the spacer 5 superposed thereon are inserted together into the slots in such a manner that only the magnetic core 3 touches a wall of the slot 8, thereby positioning the high recording density magnetic core 3 with respect to the slot 8.

The surfaces of the magnetic core 4 having an operating gap for a standard recording density, of the magnetic core 3 having an operating gap for a high recording density, and of the spacer 5 superposed on the magnetic core 3 are brought into contact with a signal recording surface of a recording medium.

A slider with such conventional magnetic heads 60 and 61 arranged vertically is shown in FIG. 7 showing a schematic construction. The magnetic heads 60 and 61 shown in FIG. 7 have respective sliders 1 that slide against a magnetic recording medium (not shown). A standard recording density magnetic core 4 having an operating gap is inserted in one substantially rectangular slot 9 formed in each of the sliders 1 and sealed up by a sealing agent, such as a glass 7 or the like.

A high recording density magnetic core 3 having an operating gap and having a spacer 5 superposed thereon is inserted in another substantially rectangular slot 8 and sealed up with a sealing agent, such as a glass 7 or the like. There are also included a back yoke 50 made of a magnetic material and joined to the magnetic cores 3 and 4 to form a closed magnetic path together with the slider 1, and recording and reproducing coils 40 and 30 wound around pillars 51 and 53, respectively, of the back yokes 50. The magnetic heads 60 and 61 are vertically disposed so as to sandwich a magnetic recording medium (not shown) as illustrated in FIG. 7.

However, as illustrated in FIG. 6A and FIG. 6B, a present rail width $W_1$ does not provide a satisfactory traceability to successfully deal wit a higher recording density. The rail width must be reduced to bring a magnetic core into further proper and stable contact with a signal recording surface of a recording medium. Referring to FIG. 6, if, for example, the rail width in the present construction is reduced to $W_2$, then the sealing glass 7 on side surfaces of the magnetic core 3 and an outrigger 2 have to be simultaneously processed (machined). These two components have different processing conditions from each other, and in case the processing conditions for the outrigger 2 are met, the glass portion is chipped. And if the chipping can-not be removed at a process for polishing the sliding surface of the slider 1, then the chipping will scratch a recording medium, causing errors when a drive is operated.

If the rail width is further reduced to $W_3$, shown in FIG. 6, then a recording medium, which is flexible, deforms and warps in the vicinity of the side surfaces of the magnetic core, adversely affecting the contact between the recording medium and a rail surface.

As shown in FIG. 7, in the upper and lower magnetic heads 60 and 61, the rail surfaces of the standard recording density magnetic cores 4 oppose the rail surfaces of the high recording density magnetic core 3 with a recording medium therebetween. Therefore, the width of each rail must be set so as to ensure reliable and stable contact between a recording medium and the opposing magnetic cores when a load pressure is applied to a magnetic head installed in a drive.

On the other hand, as previously mentioned, the rail width of the high recording density magnetic core 3 must be reduced as much as possible to enhance the traceability for magnetic disks of a higher recording density. This requirement conflicts with the requirement that the rail width of the high recording density magnetic core 3 preferably be equal to the rail width of the standard recording density magnetic core 4 in order to ensure reliable and stable contact between a recording medium and the opposing magnetic cores.

SUMMARY OF THE INVENTION

The present invention has been made in view of the above, and it is an object of the present invention to provide a magnetic head that exhibits good traceability without giving damages to itself and a magnetic disk.

To this end, according to one aspect of the present invention, in a magnetic head including a slider which comprises a plurality of magnetic cores having respective operating gaps for a standard recording density and a high recording density and an outrigger having a plurality of substantially rectangular slots for inserting the respective magnetic cores in, which slides against a magnetic recording medium, and in which one magnetic core for a high recording density having a spacer superposed thereon is inserted in one of the slots in such a manner as to touch a wall of the slot, the slider includes a rail surface which has a groove passing longitudinally through the spacer substantially at the center of its thickness and reaching both lengthwise ends of the slider, and which slides against the magnetic recording medium.

With this arrangement, the magnetic head maintains stable contact between magnetic cores and a recording medium, improves the traceability of a high recording density core, and stabilizes electromagnetic conversion characteristics.

In a preferred form of the magnetic head in accordance with the present invention, the spacer is formed of the same material as that of the outrigger.

This arrangement enables the spacer and the outrigger to have the same processing conditions, so that chipping of a glass portion can be prevented. Hence, a recording medium will not be scratched, and the occurrence of errors can be suppressed while a drive is in operation.

In another preferred form of the magnetic head in accordance with the present invention, the high recording density magnetic core and the spacer superposed thereon are inserted in one of the slots and sealed up with a sealing glass having a thermal expansion coefficient matched with that of the outrigger and the spacer.

This arrangement allows the magnetic head to be set in a predetermined position, and also prevents cracking caused by a difference in thermal expansion coefficient.

According to another aspect of the present invention, there is provided a method for producing a magnetic head including a slider which has a plurality of magnetic cores having respective operating gaps for a standard recording density and a high recording density and an outrigger having a plurality of substantially rectangular slots for inserting the respective magnetic cores in, and which slides against a magnetic recording medium, the method comprising the steps of: inserting one magnetic core for a high recording density and a spacer superposed thereon in one slot formed in the outrigger; inserting another magnetic core for a standard recording density in another slot in the outrigger; sealing the slots with a sealing glass having a thermal expansion coefficient matched with that of the outrigger; setting the slider on a slicer so that a groove with a predetermined width and depth can be cut so as to pass through the spacer substantially at the center of its thickness and to reach both lengthwise ends of the slider; cutting the groove beginning at an end of the slider to form a rail surface; polishing a sliding surface and a rear surface of the slider to a determined dimension and surface roughness: and joining the slider thus finished to a back yoke equipped with coils, then fixing the joint with an adhesive agent.

The method for producing a magnetic head makes it possible to fabricate a magnetic head that maintains stable contact between the magnetic cores and a recording medium, thereby improving traceability of the high recording density core to a recording medium and stabling electromagnetic conversion characteristics.

BRIEF DESCRIPTION OF THE DRAWINGS

FIG. 1A is a front view showing a slider of an embodiment according to the present invention;

FIG. 1B is a sectional view taken along the line A–A' in FIG. 1A;

DESCRIPTION OF THE PREFERRED EMBODIMENTS

Figure 2A:
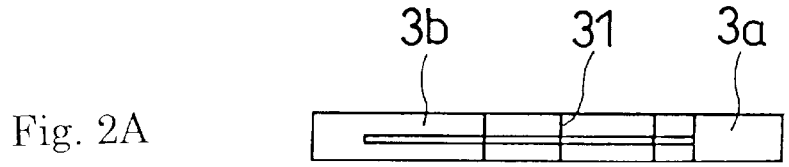
FIG. 2A is a top plan view showing a high recording density magnetic core in accordance with the present invention.

An embodiment of a slider in accordance with the present invention will be described with reference to FIGS. 1A and 1B, wherein FIG. 1A is a front view, and FIG. 1B is a sectional view taken at the line A–A'. A slider 1 includes a magnetic core 4 having an operating gap 41 for a standard recording density, a magnetic core 3 having an operating gap 31 for a high recording density, and an outrigger 2 having substantially rectangular slots 8 and 9 into which the magnetic cores 3 and 4 are inserted, respectively.

Figure 2B:
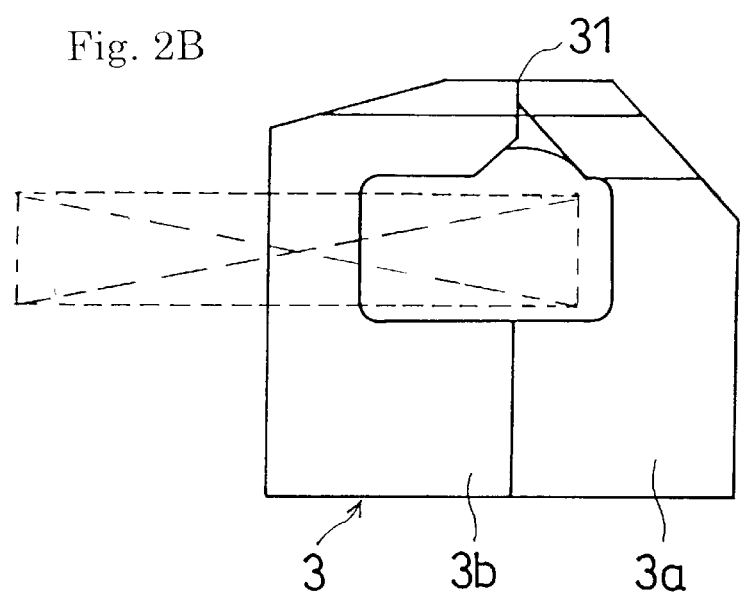
FIG. 2B is a front view showing the high recording density magnetic core in FIG. 2A.
Figure 2C:
FIG. 2C is a side view showing the high recording density magnetic core in FIG. 2A.

FIGS. 2B, 2C and 2A are a front view, a side view and a top plan view, respectively, of the magnetic core 3. As shown in FIG. 2B, core members 3a and 3b, each shaped substantially like U, are abutted against each other into one piece. The operating gap 31 is formed at the abutting portion of a surface sliding against a recording medium. A coil 30 for recording and reproduction is wound around the core member 3b.

Figure 3:
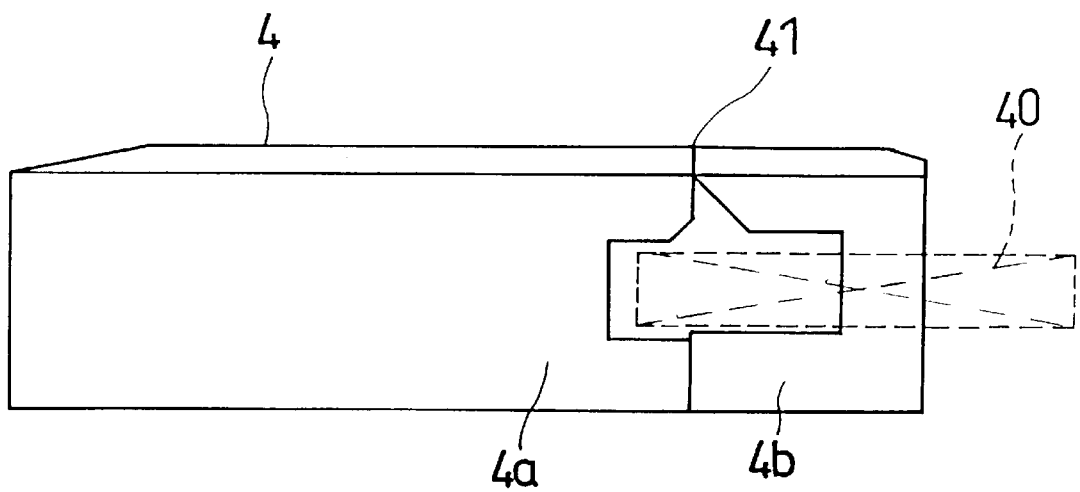
FIG. 3 is a front view showing a standard recording density magnetic core in accordance with the present invention.

FIG. 3 is a front view of the magnetic core 4. As shown in FIG. 3, core members 4a and 4b, each shaped substantially like U, are abutted against each other into one piece. The operating gap 41 is formed at the abutting portion of a surface sliding against a recording medium. A coil 40 for recording and reproduction is wound around the core member 4b.

As previously mentioned, since the magnetic core 3 is thin, it is difficult to maintain the accuracy of a die for the slot 8 of the slider shown in FIG. 1 if the slot 8 is to be made to precisely fit the magnetic core 3. Therefore, the slot 8 is made to have a width larger than the thickness of the magnetic core 3. In the slot 8, the magnetic core 3 and a spacer 5 superposed thereon are inserted together in such a manner that only the magnetic core 3 touches a wall of the slot 8 thereby positioning the magnetic core 3 relative to the slot 8.

In a similar manner, the magnetic core 4 is inserted into the slot 9.

The slots 8 and 9 are filled with a sealing glass 7 having the same thermal expansion coefficient as those of the outrigger 2 and the spacer 5, thereby sealing up the magnetic cores 3 and 4.

The surfaces of the standard recording density magnetic core 4, of the high recording density magnetic core 3, and of the spacer 5 superposed on the magnetic core 3 are brought into contact with a signal recording surface of a magnetic recording medium (not shown).

A groove 10 having a predetermined width and depth is formed so as to pass longitudinally through the spacer 5 substantially at the center of its thickness and to reach both lengthwise ends of the slider 1.

Figure 4B:
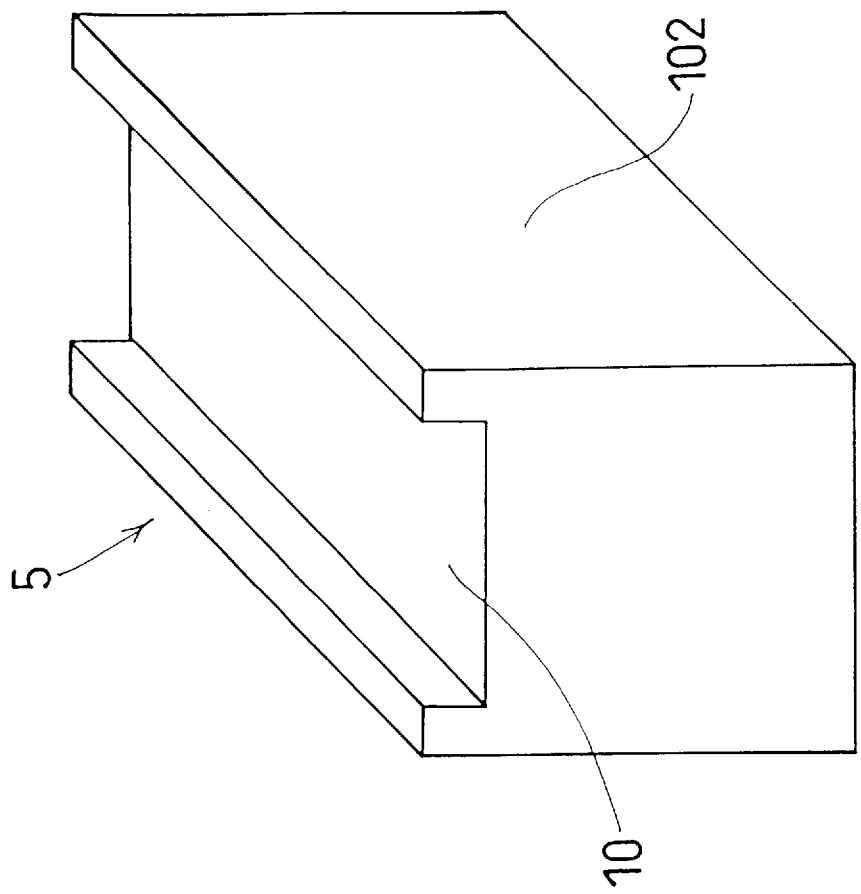
FIG. 4B is a perspective view showing a spacer in accordance with the present invention after a groove is formed.
Figure 4A:
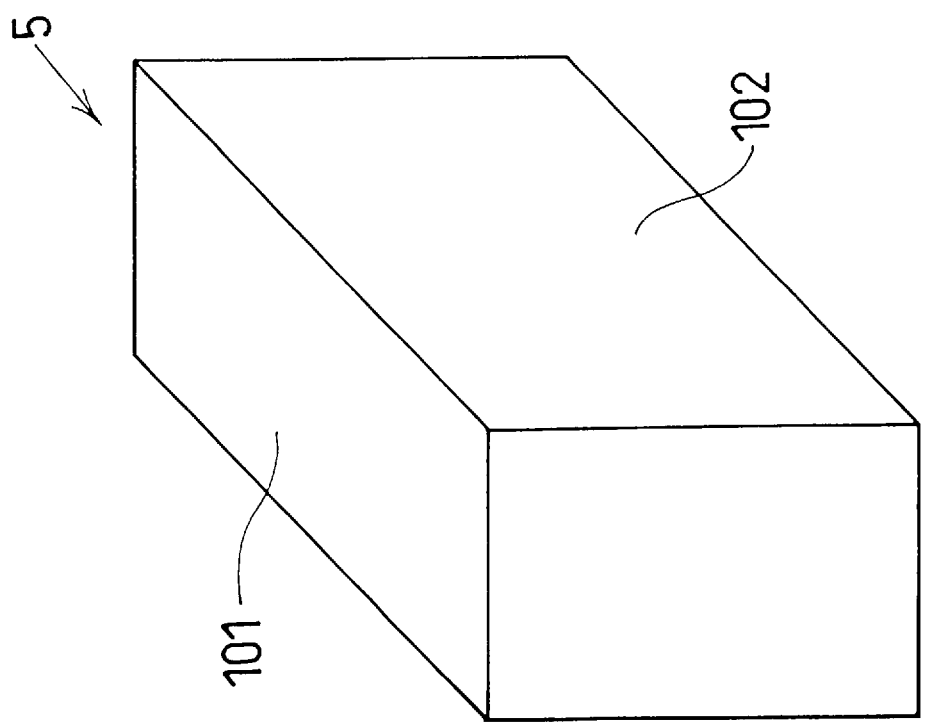
FIG. 4A is a perspective view showing a spacer in accordance with the present invention before a groove is formed.

FIGS. 4A and 4B are perspective views of the spacer 5. FIG. 4A shows the spacer 5 before the groove 10 is formed in an upper surface 101. The spacer 5 has a side surface 102 brought into contact with the high recording density magnetic core 3, and is inserted into the slot 8. FIG. 4B shows the spacer 5 after the groove 10 is formed in the upper surface 101. The groove 10 that has a predetermined depth and width passes longitudinally through the spacer 5 substantially at the center of its thickness and reaches both ends thereof.

Figure 5A:
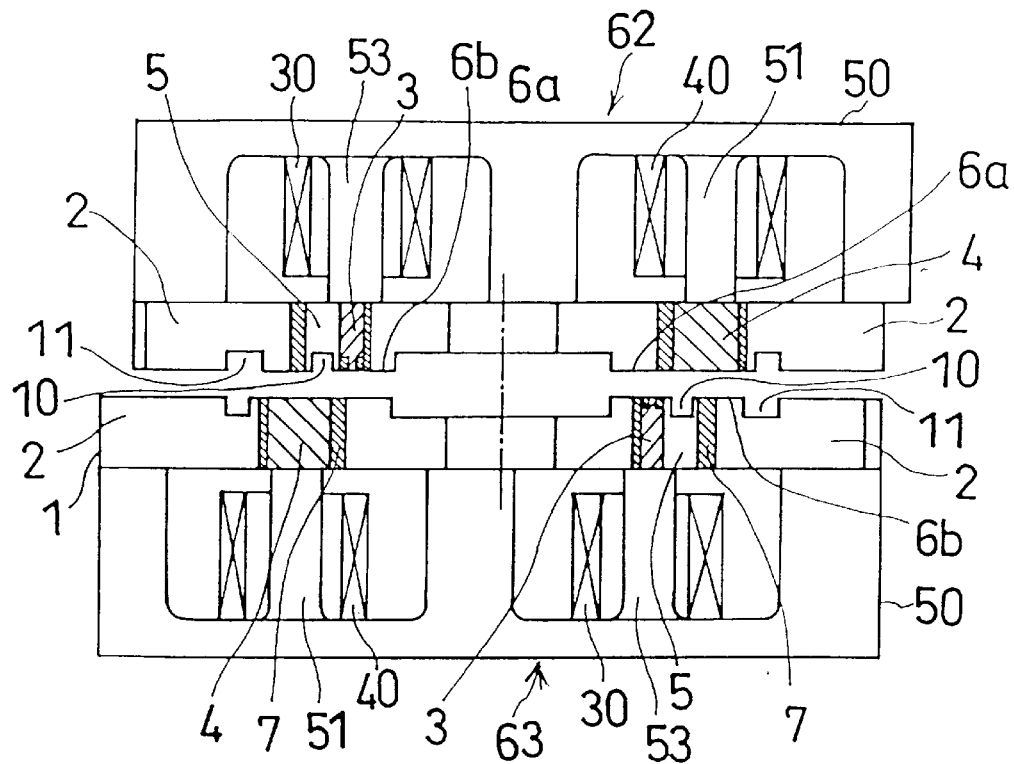
FIG. 5A is a sectional view showing a structure of a slider with magnetic heads vertically arranged in accordance with the present invention.

FIG. 5A is a sectional view of the slider 1 constructed by vertically combining magnetic heads 62 and 63 in accordance with the present invention. There are provided back yokes 50 that are composed of a magnetic material and form a closed magnetic path together with the slider 1, standard recording density coils 40 for recording and reproduction wound around respective pillars 51 of the back yokes 50, and high recording density coils 30 wound around respective pillars 53. The magnetic heads 62 and 63 are vertically disposed such that a rail surface 6a of the standard recording density magnetic core 4 and a rail surface 6b of the high recording density magnetic core 3 oppose each other with a magnetic recording medium (not shown) therebetween.

Figure 5B:
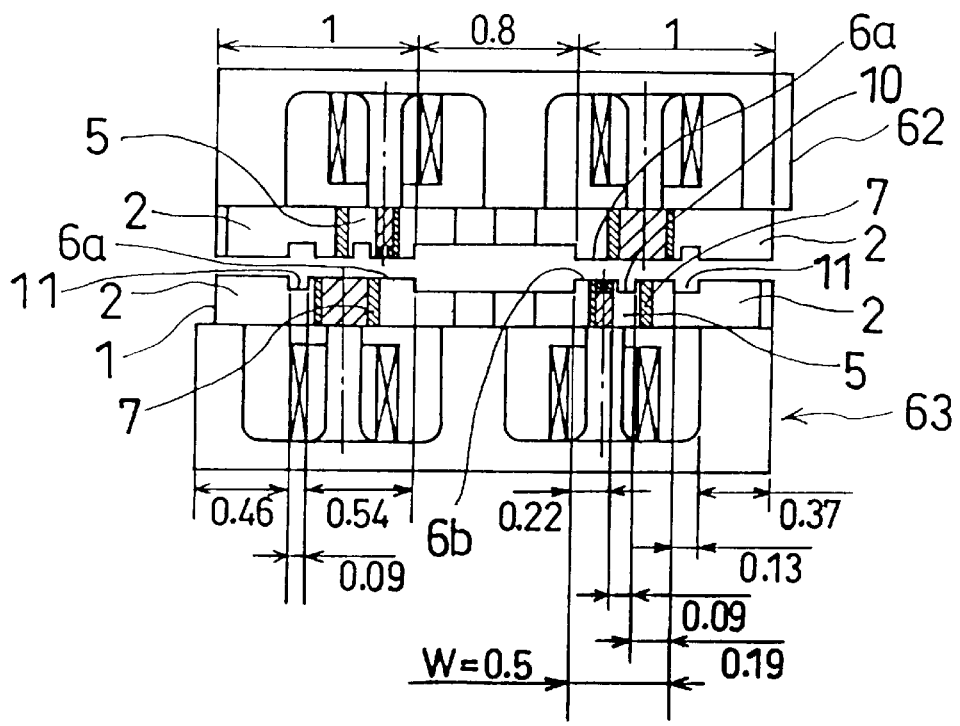
FIG. 5B is a sectional view showing an embodiment of a slider in FIG. 5A.
Figure 6B:
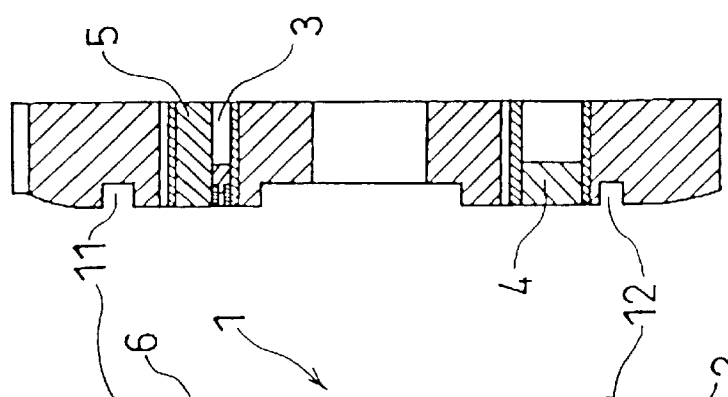
FIG. 6B is a sectional view taken along the line A–A' in FIG. 6A.
Figure 6A:
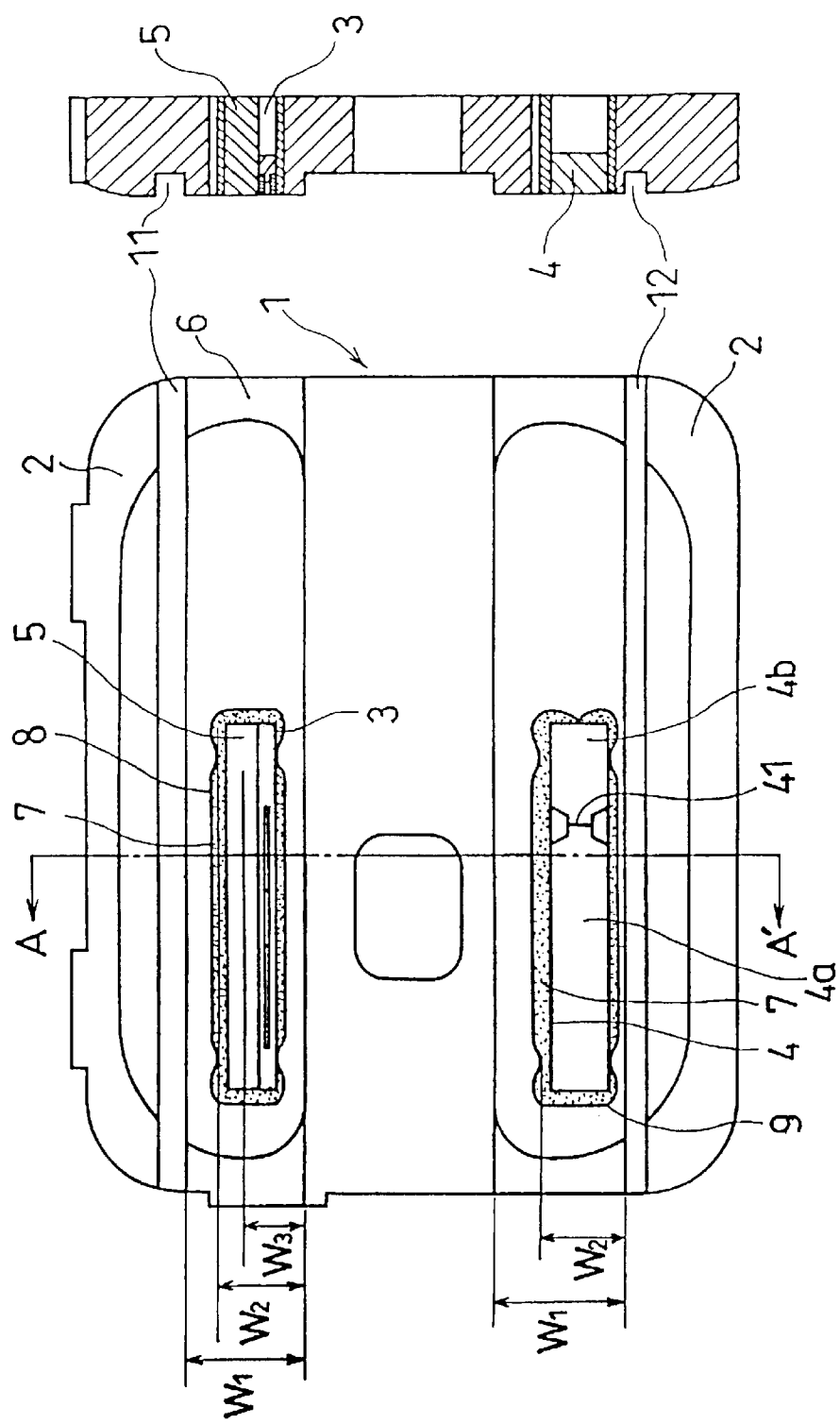
FIG. 6A is a front view showing a conventional slider.
Figure 7:
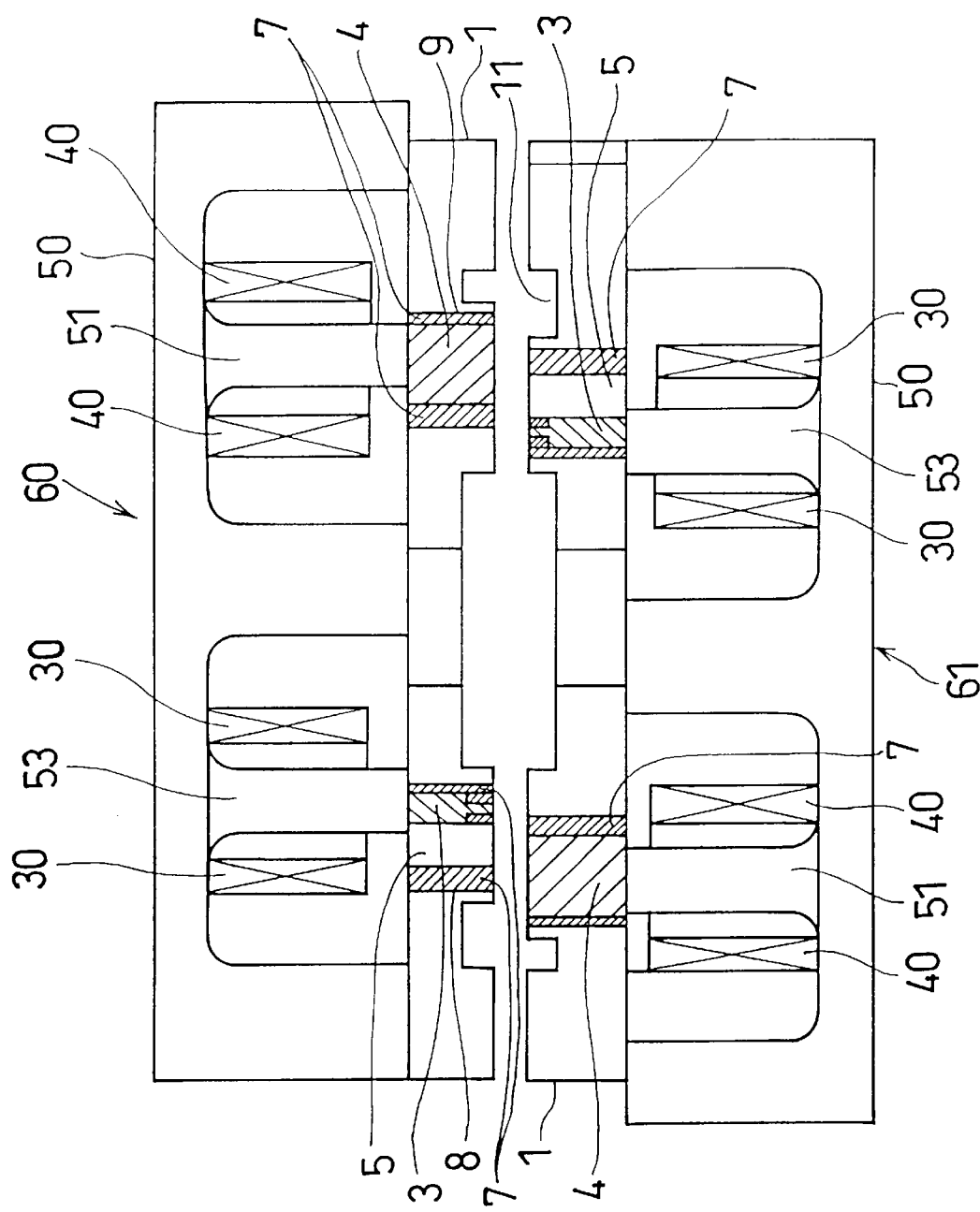
FIG. 7 is a sectional view showing a slider with conventional magnetic heads vertically arranged.

FIG. 5B is a sectional view of an embodiment of the slider 1 constructed by vertically combining the magnetic heads 62 and 63 in accordance with the present invention. $CaTiO_3$ is used as the material for the outriggers 2 and the spacers 5 of the slider 1. For the purpose of sealing, glass 7 having the same thermal expansion coefficient as those of the outriggers 2 and the spacers 5, fills the slots 8 and 9.

In the outrigger 2 of the high recording density magnetic core 3, a groove having a width of 0.09 mm is formed substantially at the center of the spacer 5. A recess is formed measuring 0.4 mm at right and left, respectively, from the center of the slider 1, the distance to an outer end surface of the spacer 5, i.e., the width of the rail surface 6b including the high recording density magnetic core 3 is set to 0.22 mm, and the total rail width W including the groove 10 is set to 0.5 mm. Furthermore, a groove 11 located 0.09 mm from the outer end of the rail 6b and having a predetermined depth and width is formed in parallel to the groove 10 so as to reach both end surfaces of the outrigger 2.

In the outrigger 2 of the standard recording density magnetic core 4, a recess is formed measuring 0.4 mm at right and left, respectively, from the center of the slider 1, and the total rail width W including the standard recording density magnetic core 4 is set to 0.54 mm. In addition, the groove 11 that is located 0.09 mm from the outer end of the rail 6a and has a predetermined depth and width is formed in parallel to the groove 10 so as to reach both end surfaces Thereafter, the slider 1 that is polished on the sliding surface and the rear surface to predetermined dimensions and surface roughness is joined to the back yokes 50 equipped with the standard recording density coils 40 and the high recording density coils 30 for recording and reproduction, then fixed using an adhesive agent.

The magnetic head in accordance with the present invention can be obtained by making the magnetic heads 62 and 63 described above and by vertically arranging them such that the rail surface 6a of the standard recording density magnetic core 4 and the rail surface 6b of the high recording density magnetic core 3 oppose each other with a magnetic recording medium (not shown) therebetween, as shown in FIG. 5B.

Thus, the magnetic head according to one aspect of the present invention includes slider. The slider comprises a plurality of magnetic cores having respective operating gaps for a standard recording density and a high recording density. The slider also comprises an outrigger having a plurality of substantially rectangular slots into which the respective magnetic cores can be inserted. The magnetic core for a high recording density has a spacer superposed thereon and is inserted into one of the slots in such a manner as to touch a wall of the slot. The slider includes a rail surface which has a groove passing longitudinally through the spacer substantially at the center of its thickness and reaching both lengthwise ends of the slider, and the rail surface slides against a magnetic recording medium. This makes it possible to reduce a rail width including a magnetic core. This width reduction is effective in improving the traceability of the magnetic cores to a recording medium and to maintain stable contact between the magnetic cores and the recording medium, whereby the traceability of the high recording density core can be improved and electromagnetic conversion characteristics can be stabilized.

In the magnetic head in accordance with the present invention, the spacer is formed of the same material as that of the outriggers, so that chipping of an edge of a rail surface during a machining process can be prevented.

Moreover, in the magnetic head in accordance with the present invention, the high recording density magnetic core having the spacer superposed thereon is inserted in one of the slots in such a manner as to touch a wall of the slot, and the high recording density magnetic core and the spacer are sealed up with a sealing glass having the same thermal expansion coefficient as that of the outriggers and the spacers. This arrangement allows the magnetic head to be set in a predetermined position, and also prevents cracking caused by a difference in thermal expansion coefficient, thus enabling a high-quality magnetic head to be accomplished.

Another aspect of the present invention provides a method for producing a magnetic head including a slider that has magnetic cores having respective operating gaps for a standard recording density and a high recording density and slides against a magnetic recording medium and an outrigger having a plurality of substantially rectangular slots for inserting the magnetic cores in, the method comprising the steps of: inserting a high recording density magnetic core and a spacer superposed on the high recording density magnetic core in one slot in the outrigger; inserting a standard recording density magnetic core in another slot in the outrigger; sealing up the components with a sealing glass having the same thermal expansion coefficient as that of the outrigger; setting the slider on a slicer to cut a groove to a predetermined width and depth that passes substantially through the center of the thickness of the spacer superposed on the high recording density magnetic core and reaches both lengthwise ends of the slider; cutting the groove beginning at an end surface of the slider to make a rail surface; polishing a sliding surface and a rear surface of the slider to predetermined dimensions and surface roughness; and joining the slider thus finished to a back yoke equipped with coils, then fixing the joints with an adhesive agent. The method for producing a magnetic head makes it possible to fabricate a magnetic head that maintains stable contact between the magnetic cores and a recording medium, thereby improving traceability of the high recording density core to a recording medium and stabling electromagnetic conversion characteristics. Alternatively, the sliding surface and the rear surface of the slider may be polished first, then a groove of a predetermined width and depth may be formed to pass longitudinally through the spacer substantially at the center of its thickness and reach both lengthwise ends of the slider.

What is claimed is:

1. A magnetic head including a slider, wherein the slider comprises:

a first magnetic core having a first operating gap for a standard recording density a second magnetic core having a second operating gap for a high recording density; and an outrigger having two substantially rectangular slots for inserting the respective magnetic cores into, the slider sliding against a magnetic recording medium together with the magnetic cores and the outrigger, wherein the second magnetic core for a high recording density has a spacer superposed thereon and is inserted into one of the substantially rectangular slots in such a manner as to touch a wall of the slot, the slider includes a rail surface which has a groove passing longitudinally through the spacer substantially at the center of a thickness of the spacer and reaching both lengthwise ends of the slider, and the rail surface slides against the magnetic recording medium.

2. A magnetic head according to claim 1, wherein the spacer is formed of the same material as that of the outrigger.

3. A magnetic head according to claim 2, wherein the magnetic core for a high recording density and the spacer superposed on the magnetic core for a high recording density inserted in one of the substantially rectangular slots are sealed up with a sealing glass having a thermal expansion coefficient matched with that of the outrigger and the spacer.

4. A magnetic head according to claim 1, wherein the magnetic core for a high recording density and the spacer superposed on the magnetic core for a high recording density inserted in one of the substantially rectangular slots are sealed up with a sealing glass having a thermal expansion coefficient matched with that of the outrigger and the spacer.

5. A method for producing a magnetic head including a slider which has a plurality of magnetic cores having respective operating gaps for a standard recording density and a high recording density and an outrigger having a plurality of substantially rectangular slots for inserting the respective magnetic cores in, and which slides against a magnetic recording medium, the method comprising the steps of:

inserting one magnetic core for a high recording density and a spacer superposed on the magnetic core for a high recording density in one slot formed in the outrigger;

inserting another magnetic core for a standard recording density in another slot in the outrigger;

sealing the slots with a sealing glass having a thermal expansion coefficient matched with that of the outrigger;

setting the slider on a slicer such that a groove with a predetermined width and depth can be formed so as to pass through the spacer substantially at the center of its thickness and to reach both lengthwise ends of the slider;

cutting the groove beginning at an end of the slider to form a rail surface; and joining the slider thus finished to a back yoke equipped with coils, then fixing the joint with an adhesive agent.

* * * * *